United States Patent
Balakrishnan et al.

(10) Patent No.: US 6,860,972 B2
(45) Date of Patent: Mar. 1, 2005

(54) PROCESS FOR DETECTING THE LOCATION OF A PHASE INTERFACE

(75) Inventors: Karithik Balakrishnan, Albany, NY (US); Danny L. McNeil, Greenville, AL (US); Martin Herke Oyevaar, Goes (NL); Claude Tinney, Montgomery, AL (US); Cornelis Adrianus Maria van Gool, Roosendaal (NL); Anthony Warren, Evansville, IN (US); Xiaolin Wu, Ithica, NY (US); Mingjie Zhu, Evansville, IN (US)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 10/064,164

(22) Filed: Jun. 17, 2002

(65) Prior Publication Data

US 2003/0085708 A1 May 8, 2003

Related U.S. Application Data

(63) Continuation-in-part of application No. 09/778,157, filed on Feb. 6, 2001, now Pat. No. 6,420,517.

(30) Foreign Application Priority Data

Mar. 28, 2002 (WO) ............................................ 0224784

(51) Int. Cl.⁷ ................................................ H05F 3/00
(52) U.S. Cl. .................. 204/164; 204/157.15; 204/223; 204/571; 204/660; 526/59; 528/196
(58) Field of Search .................... 528/196; 204/157.15, 204/164, 223, 571, 660; 526/59

(56) References Cited

U.S. PATENT DOCUMENTS

| | | | |
|---|---|---|---|
| 3,957,656 A | 5/1976 | Castelli | 210/521 |
| 4,316,009 A | 2/1982 | Rinaldi et al. | 528/502 |
| 4,338,429 A | 7/1982 | Serini et al. | 528/196 |
| 4,664,754 A | 5/1987 | Caputi et al. | 203/39 |
| 5,260,418 A | 11/1993 | Wulff et al. | 528/502 |

FOREIGN PATENT DOCUMENTS

| | | |
|---|---|---|
| DE | 19510061 | 9/1996 |
| DE | 19849604 | 4/2000 |
| GB | 2116447 A | 9/1983 |
| JP | 58223013 | 12/1983 |
| JP | 59087008 | 5/1984 |

OTHER PUBLICATIONS

International Search Report; International Application No. PCT/US 00/25784; International Filing Date: Sep. 21, 2000; 5 pages.

*Primary Examiner*—Terressa Boykin (57) ABSTRACT

Disclosed herein are processes for detecting the location of an interface between phases. In one embodiment, the process comprises: introducing a reaction mixture into a vessel wherein the reaction mixture is the product of an at least two phase interfacial reaction, and a difference in densities between at least two of the phases is less than or equal to about 1 g/cc, separating the reaction mixture into the phases with an interface located therebetween, measuring electrical inductance of the reaction mixture at different latitudinal locations; and determining the location of the interface.

8 Claims, 5 Drawing Sheets

PROCESS FOR DETECTING THE LOCATION OF A PHASE INTERFACE

CROSS REFERENCE TO RELATED APPLICATION

The present application is a continuation-in-part application based upon and claiming priority from U.S. application Ser. No. 09/778,157 filed on Feb. 6, 2001, now U.S. Pat. No. 6,420,517 which itself claims priority from Patent Cooperation Treaty patent application Ser. No. US00/25784, filed in the U.S. receiving office on Sep. 21, 2000, which is hereby incorporated by reference.

BACKGROUND OF INVENTION

There are many processes for the preparation of polycarbonates from monomers. A preferred method is a two-phase interfacial process in which phosgene is contacted with aromatic bisphenols and condensed to produce high molecular weight polycarbonates.

The two-phase interfacial process results in a reaction mixture that is an emulsion of organic and aqueous alkaline phases. In order to recover the polycarbonate product from the organic phase in which it is found, the reaction mixture is separated into its organic and aqueous alkaline phases, and the organic phase is further processed to remove undesirable impurities including electrolytes, catalysts, residues of chain terminators, and unreacted starting materials.

Such reaction mixtures contain polycarbonate polymers with molecular weights up to 40,000 grams per mole (g/mol) on a polycarbonate basis and brine present in an amount around one quarter by weight of the reaction mixture. Further, the reaction mixtures may exhibit a wide range of viscosities. In conventional processes, the initial separation of the aqueous alkaline phase from the organic phase is not complete, but leaves the organic phase containing some ten percent or more of an aqueous component. Further, the organic phase contains residual impurities such as catalysts, residues of chain terminators, and unreacted bisphenols. Thus, additional steps are needed to purify the organic phase.

For example, U.S. Pat. No. 4,338,429 describes removing alkali metal hydroxide, catalyst, and salts from the organic phase by repeated settling or centrifugation, with the addition of either aqueous acid or water in each step. The process is enhanced by the addition of shear energy and/or cationic emulsifying agents and dispersing agents to the aqueous acid step, or water-soluble organic anionic compounds to the water step.

Another method for purifying the organic phase is coalescence, as described in U.S. Pat. No. 4,316,009 and German Patent DE 19510061. The continuous process described therein involves washing and re-emulsification, followed by re-separating the two phases by conveying the emulsion through a layer of fibers that causes coalescence of the separate phases.

Another method for purifying the organic phase is to employ a series of centrifuges to remove the residual aqueous component by application of very high gravitational forces, as described in U.S. Pat. No. 5,260,418. In this process, the separated organic phase is further contacted with water and various aqueous solutions to bring the impurities into the aqueous component, which is removed and discarded.

Phase separation and purification processes employing centrifuges are time consuming and expensive to install and operate. Moreover, alternative purification methods such as extraction by countercurrent water washing and gravity separation of the two phases are much slower and less efficient. Accordingly, there is a need to provide a method for the separation and purification of reaction mixtures resulting from the two-phase interfacial process for making polycarbonate that is efficient and economical.

SUMMARY OF INVENTION

Disclosed herein is a process for detecting the location of an interface between phases. In one embodiment, the process comprises: introducing a reaction mixture into a vessel wherein the reaction mixture is the product of an at least two phase interfacial reaction, and a difference in densities between at least two of the phases is less than or equal to about 1 g/cc, separating the reaction mixture into the phases with an interface located therebetween, measuring electrical inductance of the reaction mixture at different latitudinal locations; and determining the location of the interface.

In another embodiment, the method comprises: introducing a reaction mixture into a vessel wherein the reaction mixture is the product of a two phase interfacial reaction for the preparation of polycarbonate, separating the reaction mixture into an organic phase and an aqueous phase with an interface located therebetween, measuring electrical inductance of the reaction mixture at different latitudinal locations, and determining the location of the interface.

The above described and other features are exemplified by the following figures and detailed description.

BRIEF DESCRIPTION OF DRAWINGS

Referring now to the figures, which are exemplary embodiments, and wherein the like elements are numbered alike.

DETAILED DESCRIPTION OF INVENTION

Provided herein is a process for the separation and purification of reaction mixtures obtained in the process for preparation of polycarbonate by two-phase interfacial polymerization. The process employs one or more plate decanter separation devices in combination with coalescer decanters and/or centrifuge type separation devices.

The reaction mixture to be separated is the effluent from a resin reactor producing polycarbonate. Polycarbonate can be produced in batch or continuous mode by a two-phase interfacial process. The resin reactor effluent comprises a heavy organic component including the desired polycarbonate and a light aqueous inorganic component. Typically, the ratio of the aqueous phase to the organic phase is about 10:90 to about 70:30 weight percent. The polycarbonate component is typically present in an amount of about 10 to about 20 weight percent. The polycarbonate contained in the effluent may have, but is not limited to, a weight average molecular weight of about 15,000 to about 40,000 g/mol on a polycarbonate basis. Consequently, the effluent may have a wide range of viscosities. The effluent may also have, but is not limited to, a salt concentration of about 14 to about 22 weight percent (wt %), based upon the total weight of the effluent.

The plate decanter has a container having a long axis which is oriented at an angle with respect to gravity, the angle being about 30° to about 60°, preferably about 45°. The decanter is filled with plates, which also are therefore at the same angle. Preferably, the plates have a corrugated structure. A fluid mixture to be separated is introduced into the top of the plate decanter, and under the influence of gravity the heavier phase flows to the bottom of the decanter while the lighter phase flows to the top. The principles governing gravity decantation of an emulsion are based on Stoke's Law. For example, in a decanter, as the difference in density between the dispersed and continuous phases of an emulsion increases, the separation time decreases.

The use of a plate decanter can be combined with coalescence devices. Coalescence is the process by which droplets of the dispersed phase of an emulsion are brought together to form a continuous phase. Coalescence of polycarbonate dispersions can be achieved by conducting the dispersion through a layer of fibers, preferably glass, steel, or polymeric fibers. More particularly, coalescing elements are added to the interior of an empty decanter. Preferably, the coalescing elements are a combination of metal and TEFLON® such as elements available from Otto York. The coalescing size and number so as to provide a residence time in the decanter of about 3 to about 15 minutes, preferably, about 1.5 to about 2 minutes. In an alternate embodiment, one or more plate decanters are combined with other separation devices including decanter coalescers and/or centrifuges. Various combinations of these devices can be used to separate polycarbonate reactor effluent.

In an exemplary embodiment detection of the location interface of the two separated phases in a decanter can be achieved by utilizing a sonar or ultrasonic probe. A sonic wave is sent from the clear aqueous phase toward the interface with the polycarbonate resin containing phase. The echo from the interface is used to determine the interface location. By determining the location of the interface more precisely, cross contamination of separated phases upon transfer is minimized.

Alternatively, or in addition, detection of the location interface of the separated phases in a decanter can be conducted by utilizing toroidal inductance probes. Toroidal inductance probes can be present in the decanter, immersed in the separated phases. These probes measure differences in electrical inductance between the separated phases, and thereby determine the interface location. Preferably, these probes are disposed in a sheath that is resistant to both phases to be separated (e.g., to methylene chloride and pH brine (e.g., a pH of greater than or equal to about 7), and preferably up to temperatures of about 150° C. Possible sheath materials can comprise tetrafluoroethylene fluorocarbon copolymers, e.g., TEFLON®, commercially available from Du Pont de Nemours. (Tefzel is used for higher resistance)

In exemplary embodiments, the operating temperatures for all streams are about 60° F. (about 16° C.) to about 100° F. (about 38° C.), and more preferably about 80° F. (about 27° C.) to about 100° F. The operating pressures for all streams are preferably 0 to about 100 pounds per square inch gauge (psig), with about 30 to about 80 psig more preferred.

Figure 1:
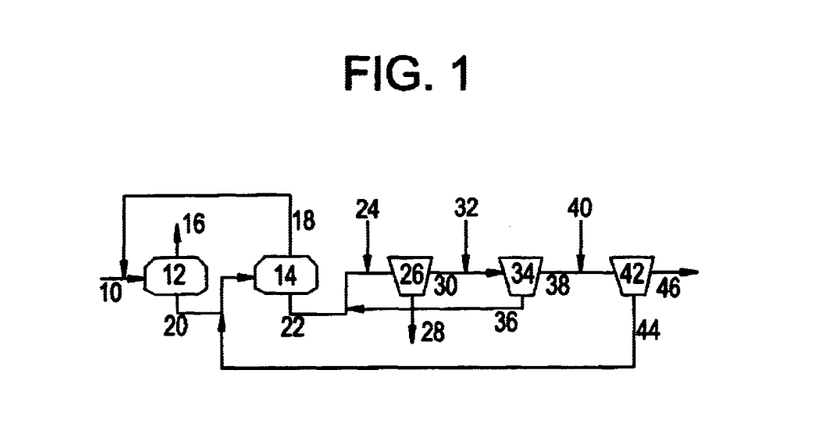
FIG. 1 is a schematic of a separation network that includes two plate decanters and three centrifuges arranged in series.

In the embodiment shown in FIG. 1, plate decanters may be combined with centrifuges, to separate a reaction mixture. A reaction mixture 10 can be introduced into a series of separation devices including first 12 and second 14 plate decanters that will separate the emulsified reaction mixture into first 16 and second 18 lighter aqueous phases, and first 20 and second 22 heavier organic phases. Preferably, the residence time in each of the plate decanters is about 5 to about 6 minutes. The lighter aqueous brine phase 16 can be removed from the plate decanter 12 and discharged. The second lighter aqueous phase 18 can be removed from the second plate decanter 14 and recycled back into the original reaction mixture 10. The second heavier organic phase 22 can be acidified 24 (e.g., with hydrochloric acid or the like) and separated in a first centrifuge 26. The wastewater 28 will be removed from the first centrifuge 26 and the organic phase from the first centrifuge 30 can be mixed with water 32 and added to a second centrifuge in series 34. The wastewater 36 from the second centrifuge 34 can be recycled with organic phase 22 from the second decanter 14. The organic phase 38 from the second centrifuge 34 can be mixed with water 40 and added to a third centrifuge 42 after centrifugation. The wastewater 44 from the third centrifuge 42 can be recycled with organic phase 20 from the first decanter 12.

Also contemplated are embodiments in which the reaction mixture is conducted into a separation network comprising a plurality of plate decanters and a plurality of coalescers that are operated in series or in parallel, in any order, and in any combination. The outputs of the plate decanters and coalescer decanters may be combined in any order, thereby separating the reaction mixture into an organic phase and an aqueous phase. The organic phase from the network may be conducted into a series of centrifuges, and then into another network in a repetitive process.

Figure 2:
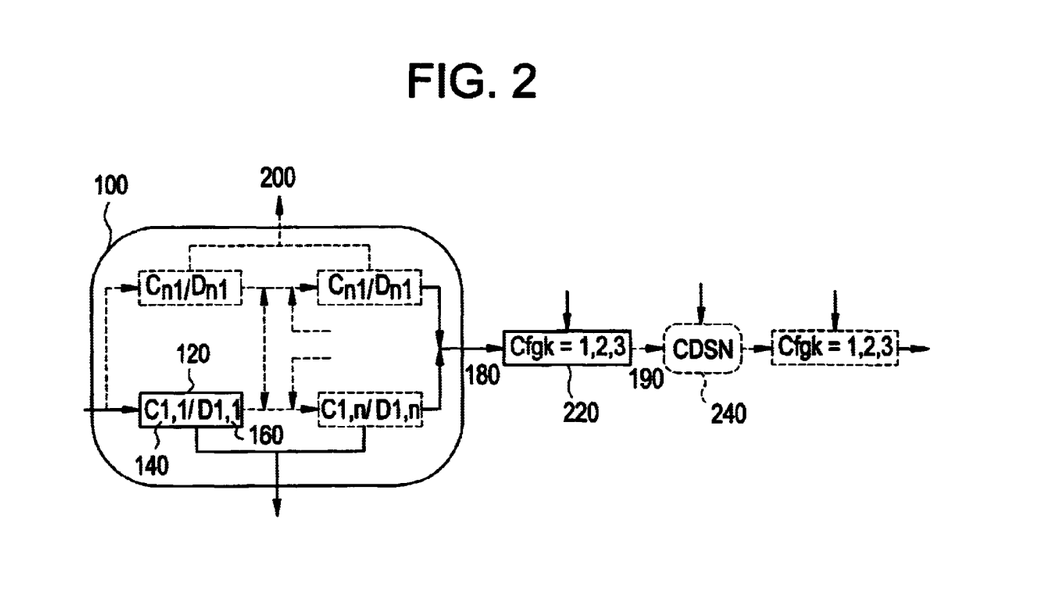
FIG. 2 is schematic illustrating an array of plate decanter and, optionally coalescer decanters, used to form a separation network in combination with centrifuges.

FIG. 2 illustrates an alternate embodiment in which an array 100 of plate decanters and decanter coalescers is used for the separation of the reaction mixture containing polycarbonate. The array hereinafter referred to as a Coalescer/Decanter Separation Network, "CDSN" comprises a plurality of units 120 comprising plate decanter(s) 160 and/or decanter coalescer(s) 140. The array comprises "m" rows where each row consists of "n" units in series, and in which the organic phase output of each unit is fluidly connected with the outputs of units having the same value of "n" in other rows. The organic phase outputs of the last unit of each row of the array are combined thereby separating a reaction mixture into an organic phase 180 and an aqueous phase 200. The organic phase may be conducted into a series of centrifuges 220, and then into another array in a repetitive process. The series of centrifuges, "$Cfg_k$" 220 (where k equals 1, 2, 3 . . . etc.), can be used for acid or water washing of the organic phase. Optionally, the resulting organic phase 190 obtained may be separated in a second array 240. The second array of separation devices CDSN, may be the same or different than the first array of separation devices.

When one separation device is operated in "series" with a second separation device, the output of one device, for example the organic phase output, is provided as the input to the second device. Thus, a "series of devices" means a plurality of devices operating in series pair-wise to form one serial chain. When one separation device is operated in "parallel" with a second separation device, the corresponding outputs of each device, for example the organic phase outputs, are combined to provide one stream in a further process.

In all embodiments, the separation devices operate to divide the dispersion into light and heavy phases. In addition to the input of a polycarbonate dispersion, each device may have inputs at various points for charging water or other solutions, including charging heavy or light phases conducted to the device from another portion of the process. Each device may also have more than one point from which particular outputs, for example the light phase, are conducted.

The following examples further describe and demonstrate embodiments within the scope of the present invention. The examples are given solely for the purpose of illustration and are not to be construed as limitations of the present invention.

EXAMPLE 1

A plate decanter was tested on a polycarbonate resin separation line consisting of three centrifuges. A primary centrifuge was used for resin and brine separation. A second centrifuge was used for acid washing the resin solution to reduce the chloride concentration in the third centrifuge to avoid excessive corrosion in the third centrifuge.

In order to test the use of a plate decanter, a 200 liter decanter unit from Esmitec/FIB was tested on the discharge of a feed pump of the resin separation line. The separated light and heavy organic phases from the top and bottom of the decanter were fed back to the input of the centrifuge feed pump. The gravity decanter consisted of a pipe of 2.6 meter length and a diameter of 300 mm. The decanter was filled with 11 plates, as supplied by Estimtec/FIB. The distance between the plates was 26 mm. The feed entered the unit from the top. To prevent backwashing from the light water phase by the feed, flow collection trays were installed in the top section above the highest points of the plates. The separation zone was 1,200 mm long. The decanter had an angle of 45 degrees with the horizon. The discharge piping was constructed such that the interface of the two separated phases was above the plates.

The feed mixture of the decanter consisted of both an aqueous phase, brine or wash water, and an organic phase, polycarbonate resin dissolved in methylene chloride. The feed mixture entered the decanter through a 1 inch feed line and was distributed by a splash plate located internally 15 mm after the end of the inlet pipe over the plates. The splash plate diameter was 130 mm for a 60 mm pipe. The aqueous phase, being the light phase, flowed to the top of the decanter, while resin solution flowed to the bottom. The feed flow was varied and adjusted by the visual inspection of the water phase. When large droplets of heavy phase were seen in the light phase sight glass, the feed flow was reduced.

For testing, the decanter has an input device for the first centrifuge, separation efficiency was detected at the second centrifuge. A resin solution sample, i.e., the heavy phase was removed at the second centrifuge and mixed with 10 volume percent (vol %) pure distilled water, stirred, and separated. The separated water was analyzed for chloride. The water phase was sampled and visually inspected, and judged on the same basis as a water sample from the centrifuge.

A base-line study conducted over a period of eight weeks before installing the decanter gave an average chloride concentration in the water discharge of the second centrifuge of 7,184 milligrams per liter (mg/L) solution, maximum 10,678 mg/L, minimum 3,964 mg/L, standard deviation 1,972 mg/L. This corresponds to a carry-over of 1.39 weight percent brine in the output organic phase from the first centrifuge. By comparison, the heavy phase leaving the decanter was sampled and analyzed for chloride. The average chloride concentration in this extraction water was 2,766 mg/L, standard deviation 2,523 mg/L, corresponding to a brine carry-over of 0.53%.

This test showed very good separation on both phases at a feed flow of 1,600 to 2,000 liters per hour (lt/hr). During the total test time of 4 weeks no rag layer formation at the interface was observed.

EXAMPLE 2

A reaction mixture containing polycarbonate can be prepared using an interfacial reaction process. Such a reaction mixture may be separated and purified using two plate decanters and three centrifuges in accordance with the process shown in FIG. 1. A calculation using mass balance assuming an input stream composition, brine carry-over and polycarbonate content in accordance with Example 1 was performed.

The results are summarized in Table 1 where PC is polycarbonate, $MeCl_2$ is methylene chloride, BPA is bisphenol A and TEA is triethylamine. Final outflow of the purified organic phase consisted of 0.5 weight percent water carry-over.

TABLE 1

|  | 10 wt % | 16 wt % | 20 wt % | 18 wt % | 22 wt % | 28 wt % | 30 wt % | 36 wt % | 38 wt % | 44 wt % | 46 wt % | 24 wt % | 32 wt % | 40 wt % |
|---|---|---|---|---|---|---|---|---|---|---|---|---|---|---|
| H2O | 19.75 | 78.60 | 0.79 | 97.66 | 0.98 | 98.90 | 0.20 | 99.49 | 0.20 | 99.50 | 0.50 | 67.00 | 99.90 | 99.90 |
| NaOH | 0.00 | 0.00 | 0.00 | 0.00 | 0.00 | — | — | — | — | — | — | — | — | — |
| Na2CO3 | 0.45 | 1.32 | 0.01 | 0.11 | 0.00 | — | — | — | — | — | — | — | — | — |
| NaCl | 6.68 | 19.57 | 0.20 | 1.70 | 0.02 | 0.14 | 0.00 | 0.00 | 0.00 | 0.00 | 0.00 |  | 0.00 | 0.00 |
| HCl | — | — | — | — | — | 0.10 | 0.00 | 0.00 | 0.00 | 0.00 | 0.00 | 33.00 | — | — |
| MeCl2 | 60.59 | 0.41 | 82.03 | 0.41 | 82.04 | 0.41 | 82.74 | 0.41 | 82.74 | 0.41 | 82.49 |  | 0.10 | 0.10 |
| PC | 12.49 | 0.09 | 16.91 | 0.09 | 16.91 | 0.09 | 17.06 | 0.09 | 17.06 | 0.09 | 17.00 |  |  |  |
| BPA | 0.00 | 0.00 | 0.00 | 0.00 | 0.00 | 0.00 | 0.00 | 0.00 | 0.00 | 0.00 | 0.00 |  |  |  |
| TEA | 0.04 | 0.01 | 0.05 | 0.03 | 0.05 | 0.37 | 0.00 | 0.01 | 0.00 | 0.00 | 0.00 |  |  |  |
| Temp. F. | 60–100 | 60–100 | 60–100 | 60–100 | 60–100 | 60–100 | 60–100 | 60–100 | 60–100 | 60–100 | 60–100 | 60–100 | 60–100 | 60–100 |
| pH |  | 10.40 |  | 9.34 |  | 1.58 |  | 3.37 |  | 5.12 |  | (0.96) | 7.00 | 7.00 |

EXAMPLE 3

Figure 3:
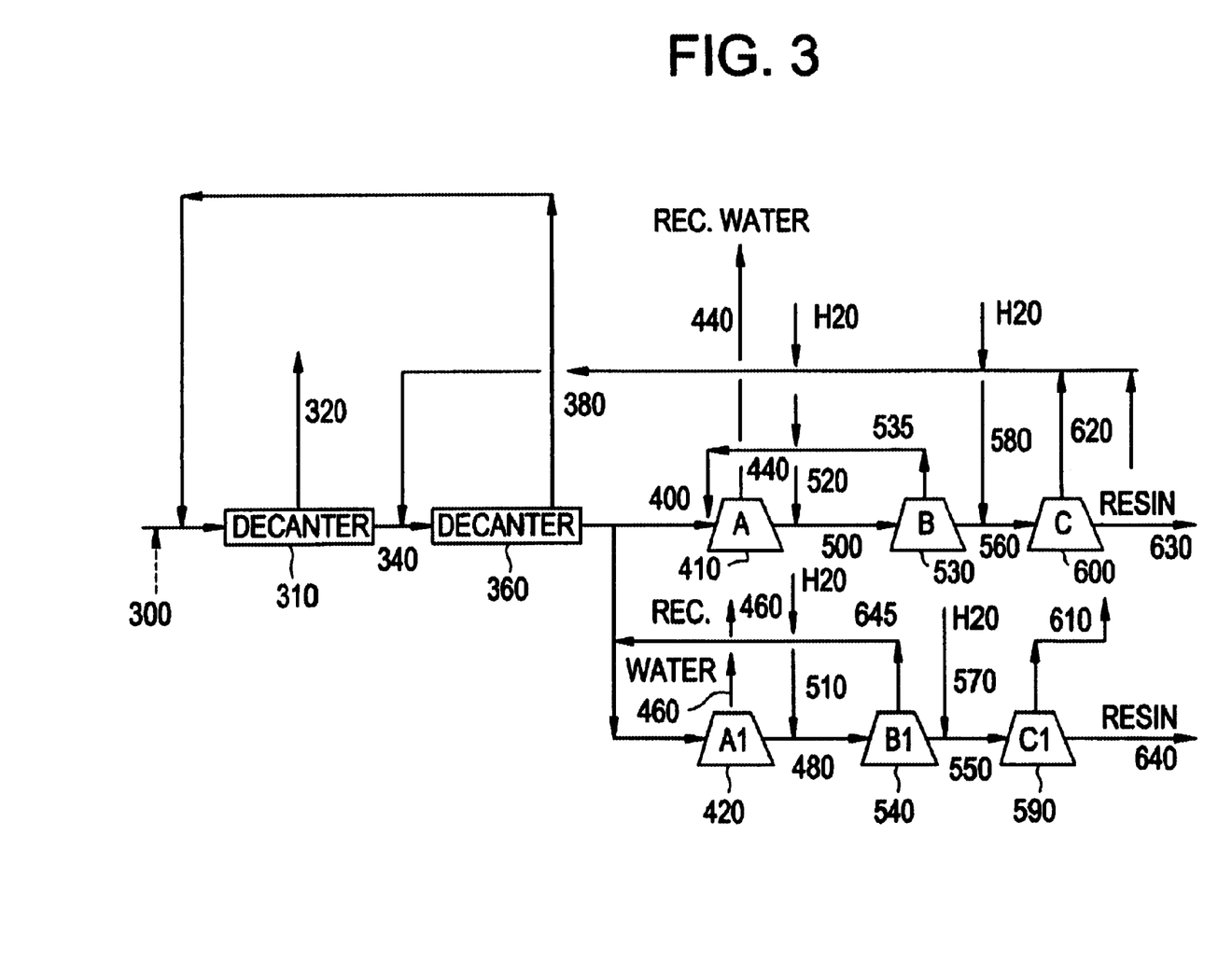
FIG. 3 is a schematic illustrating a separation network that includes two plate decanters in series before six centrifuges arranged in parallel.

An alternative separation network includes two plate decanters in series continuous with two sets of three centrifuges in parallel as shown in FIG. 3. Effluent 300 from a plant reactor preparing polycarbonate using a two phase interfacial process is introduced into a plate decanter 310 which separates the effluent into a lighter brine phase 320 and a heavier organic phase 340. The lighter brine phase is discarded. The heavier organic phase 340 is introduced into a second decanter 360. The second lighter phase 380 is removed from the second decanter 360 and recycled back into the effluent 300. The second heavier organic phase 400 is split. A portion of the second organic phase 400 is received by centrifuge A 410 and the reminder is received by centrifuge A1 420. The lighter aqueous phases 440 and 460 are removed from centrifuge A and A1, respectively and recycled for the water content. The heavier organic phases 480 and 500 are removed from centrifuge A and A1, mixed with water 510 and 520 and added to the second centrifuges in series B, 530 and B1, 540, respectively. The light aqueous phases 535 and 645 are removed from the B and B1 centrifuges, are recycled with heavy phase 400 from the second decanter 360. The heavy phases 550 and 560 are removed from the B and B1 centrifuges mixed with water 570, 580 and added to centrifuge C1 590 and C 600, respectively. The light aqueous phases 610 and 630 are removed from centrifuges C and C1 and recycled with heavy phase 340 from decanter 310. The heavy phrases 630 and 640 are removed from centrifuges C and C1 and polycarbonate resin obtained therefrom.

EXAMPLE 4

Figure 4:
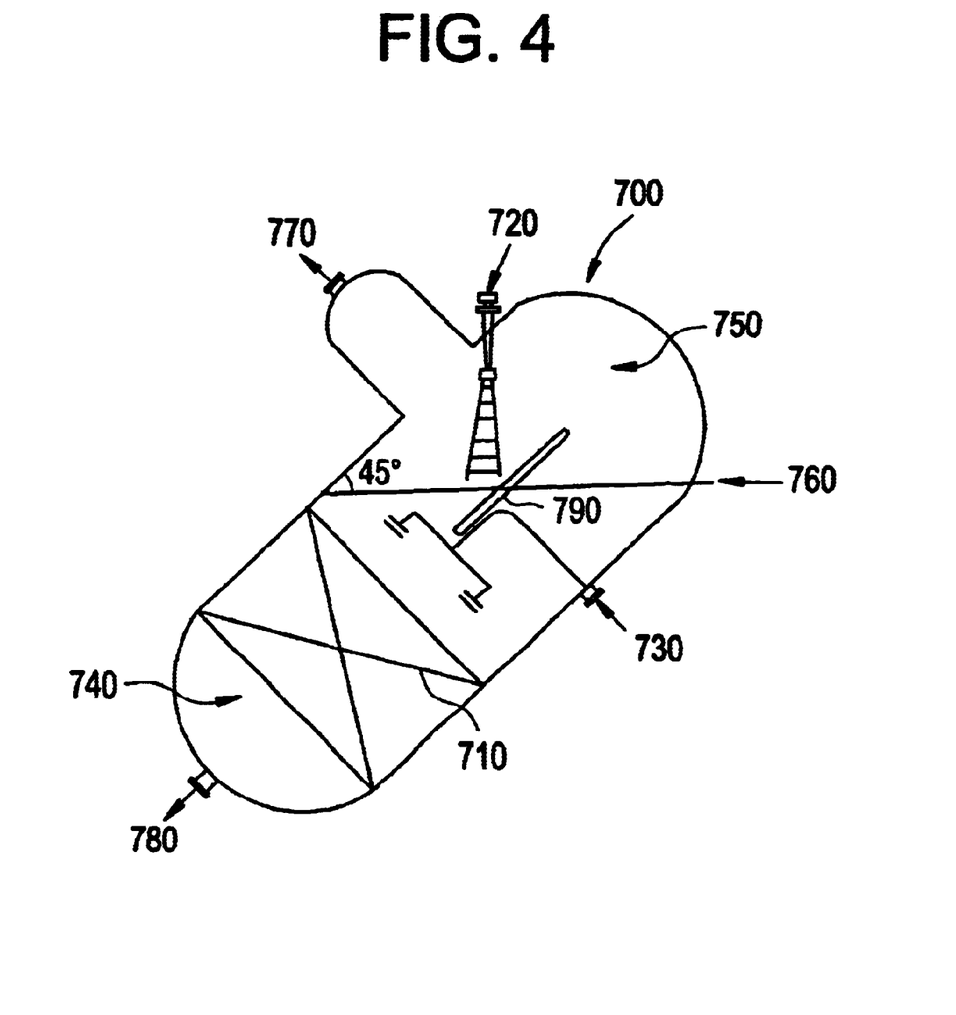
FIG. 4 is a sectional view of a plate decanter including a sonar probe.

A reactor effluent solution having a polycarbonate concentration of about 10 to about 18 weight percent in the organic phase, and a brine or aqueous phase having a specific gravity of about 1.0 to about 1.16 was fed into and removed continuously from a plate decanter. The feed rate provided a residence time in the decanter of about 10 to about 30 minutes. Continuous operation and a limited residence time created some waves or turbulence around the interface that made interface detection difficult. The decanter 700 was fitted with plate bundle 710 and a sonar probe 720 of the top—down type available from Accu-Gage as shown in FIG. 4. Effluent solution entered the decanter 700 through feed inlet port 730. The effluent separated into an organic phase 740 and a brine phase 750 with interface 760 therebetween. The brine phase was removed through the brine outlet 770 located at the top of the decanter and the heavier organic phase was removed through the organic phase outlet 780 at the bottom of the decanter. Optionally, additional plates may be placed in brine outlet 770 to improve separation. The results of the interface measurement using the probe was compared with visual observations using a sight glass 790 on the outside of the decanter are given in Table 2.

TABLE 2

| | Interface measurement using probe | Interface measurement using visual observation |
|---|---|---|
| Average value of interface location | 35.27 | 33.23 |
| Average measurement errors of probe versus visual observation | 4.98 cm | |
| Standard Deviation of Measurement Errors | 2.62 cm | — |
| Number of Measurements | 93 | 93 |
| Measurement range | 0–50 cm | 0–50 cm |

The average measurement errors reported in Table 2 is the difference between the average value of the interface location obtained using the 93 probe measurements versus the average of 93 visual observations. The standard deviation of measurement errors was calculated from the sonar probe measurements and average sonar probe value. The average measurement errors should be reduced by recalibration of the probe transducer. In addition, there was a contribution to the standard derivation of measurement errors by the visual observation measurement due to wave formation at the interface and the large size of the decanter. Other test probes such as differential pressure or nuclear probes yielded less accurate and less reliable results than the sonar or ultrasonic probe.

EXAMPLE 5

The probes comprised two coils not in contact with each other, enclosed in a TEFLON® sheath. One coil, i.e., "the primary", was energized using an alternating current (AC) voltage. When the probe was immersed in a solution of finite electrical conductance (for example brine), the induced magnetic field produced a current in the secondary (i.e., the other coil), which was recorded as a voltage in a transducer. The magnitude of the current in the secondary is proportional to the inductance of the surrounding medium. Thus, with a polymeric solution that is not electrically conductive, the voltage measured was about 0. For a pure brine solution (any other electrolyte), the voltage measured was high (e.g., 2.4 volts (V) in this case).

For a dispersion containing the polymeric solution and the brine, the voltage is between zero and the maximum and is a function of the fractions of both phases. Thus for the case of the decanter wherein the lower phase is resin (zero inductance), the upper phase is brine (maximum inductance), and the interface is a dispersion of the two phases (intermediate inductance), the interface location can be determined by a series of stacked probes and the region of intermediate values of inductance determines the interface location. For example, for a stack of probes with voltage readings of 0, 0.25, 0.5, 0.8, 1, 1.5, 2, 2.5V at x is 0, 1, 2, 3, 4, 5, 6, 7 centimeters (cm) from the first probe (which, in this example, is completely in the resin phase, where the pure brine at the top is 2.5V and pure resin is 0 V at the bottom). The interface location is the region of the two phase dispersion where the brine/resin fraction is 50%, which corresponds to a voltage of 1 V (obtained from calibrations of the probe). From the series of values, the corresponding position of the interface is x is 5 cm from the lowest probe.

Figure 5:
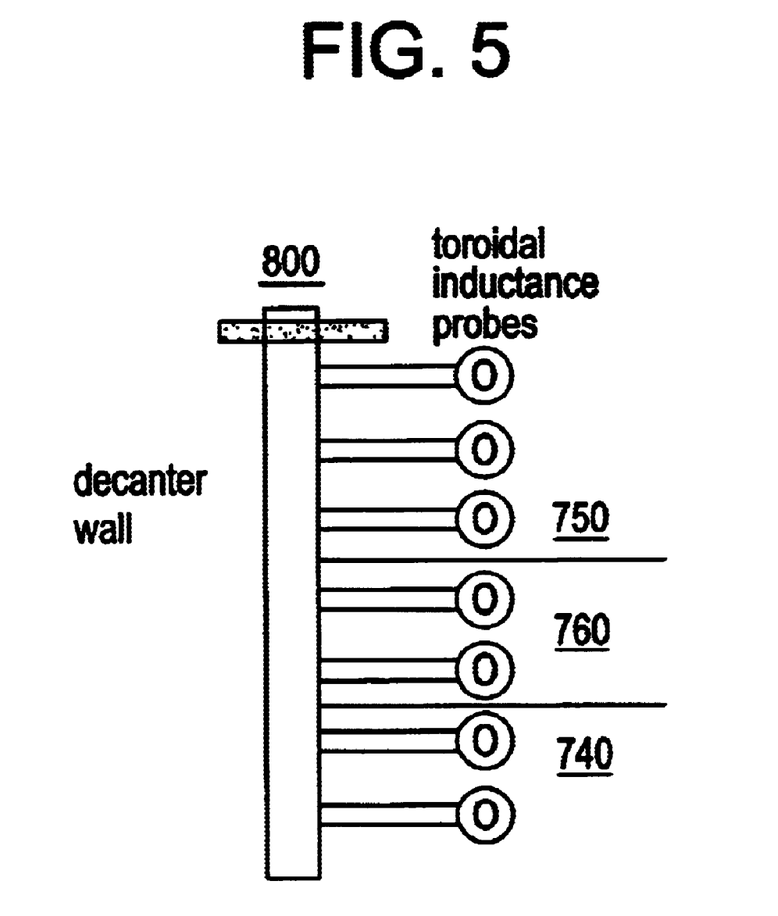
FIG. 5 is a sectional view of a stack of toroidal inductance probes.

As shown in FIG. 5, toroidal inductance probe stack 800 can be utilized to measure the differences in electrical inductance between brine phase 750, organic phase 740, and interface 760 therebetween. Thereby, the location of interface 760 be determined. Precisely determining the location of interface 760 minimizes cross contamination of organic phase 740 with brine phase 750 upon transfer.

Figure 6:
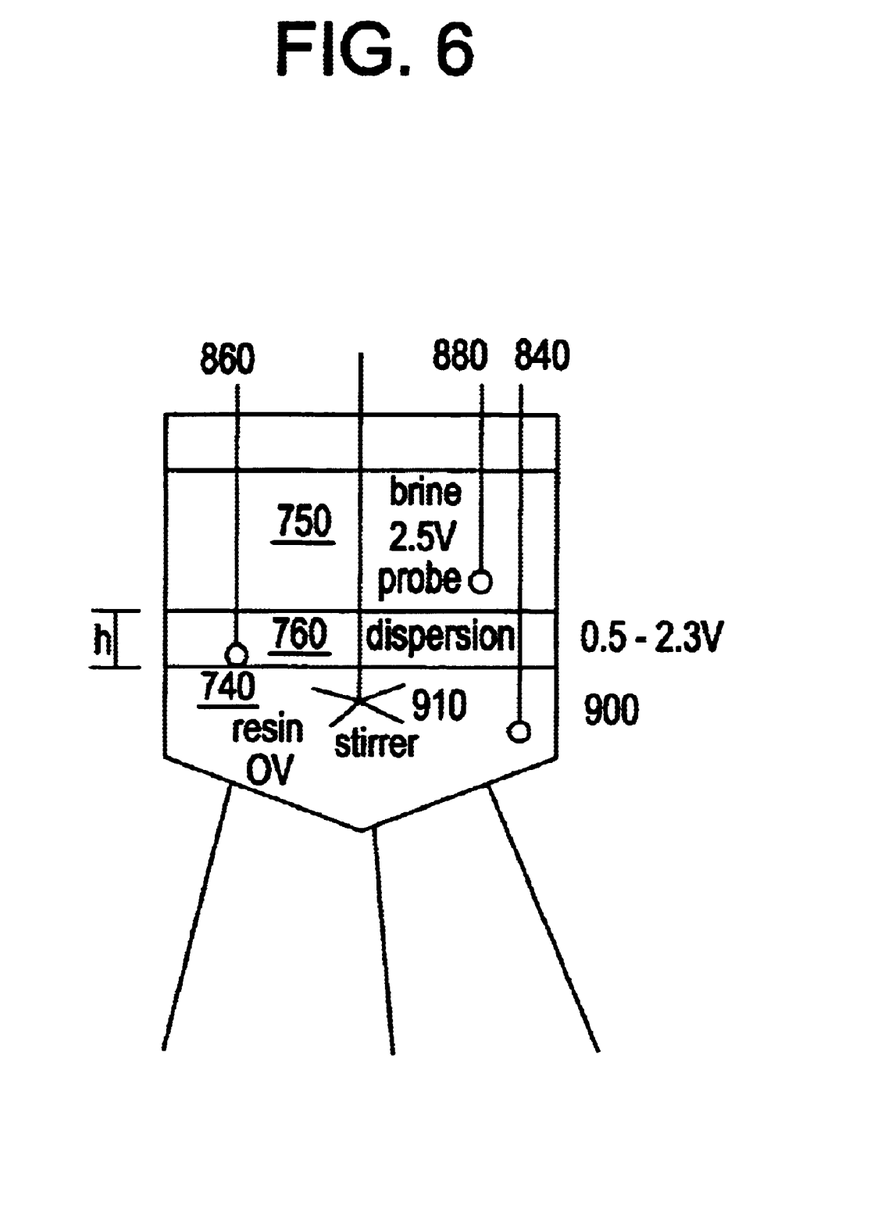
FIG. 6 is a sectional view of a bench scale decanter including a stack of toroidal inductance probes.

As shown in FIG. 6, toroidal inductance probe 840, toroidal inductance probe 860, and toroidal inductance probe 880, for use in determining interface location, were tested using bench scale decanter 900. Effluent was introduced into decanter 900. The effluent separated into organic phase 740 and brine phase 750 with interface 760 therebetween. Probe 840, probe 860, and probe 880 were placed in decanter 900 and immersed in the separated phases. Probe 840, probe 860, and probe 880 were each immersed at different depths within the separated phases. Agitator 910 was used to vary the height of interface 760, which is a dispersion of brine phase 750 and organic phase 740, to simulate a phase interface that might occur in a decanter during a phase separation process. The height of interface 760 is defined as the vertical distance, measured in inches, from organic phase 740 to brine phase 750 as confined in decanter 900. The position of interface 760 can be varied by increasing or decreasing the relative amounts of brine phase 750 and organic phase 740.

To detect the location of interface 760, a driver voltage of 12 Volts was applied to a primary coil in each of probe 840, probe 860, and probe 880, to generate a magnetic field around each of probe 840, probe 860, and probe 880, respectively, thereby induce a current in each secondary coil. The current induced in the secondary coil passes through an electrically connected resistor and the voltage drop across the resistor (output voltage) is measured. The output voltage is proportional to the inductance of the solution in which the probe is immersed. The output voltage data is fed into a data acquisition system electrically connected to a computer or other data processing device.

For example, when probe 840 is immersed in organic phase 740, the measured voltage is 0 Volts. In contrast, when probe 880 is immersed in brine phase 750, the output voltage can be about 2.4 volts (V). When probe 860 is immersed in interface 760, the output voltage may be less than or equal to about 2.4 V depending on the amounts of brine phase 750 and the amount of organic phase 740 present.

Two tests were conducted, one in which agitator 910 was used to create a height of interface 760 of about 1 inch, and a second wherein agitator 910 was used to create a height of interface 760 of about 2 inches. The tests were set up according to the scheme illustrated in FIG. 6. Depending on height of interface 760 and the amount of brine phase 750 and organic phase 740 present in interface 760, the output voltage measured by probe 860 varied. The measured voltage recorded for each of probe 840, probe 860, and probe 880 is illustrated in Table 3 below.

TABLE 3

| Case # | Probe | Approximate Interface Thickness (in.) | Output Voltage (v) |
|---|---|---|---|
| I | Probe 840 | 1 | 0 |
| I | Probe 860 | 1 | 1.4 |
| I | Probe 880 | 1 | 2.5 |
| ii | Probe 840 | 2 | 0 |
| ii | Probe 860 | 2 | 0.8 |
| ii | Probe 880 | 2 | 2.4 |

A third test was conducted in which dispersions of brine phase and organic phase were prepared, each with varying amounts of brine phase added. The dispersions were prepared each in a separate beaker, and a toroidal inductance probe was immersed in each dispersion. Output voltage was measured. The test was conducted to determine the amount of brine phase needed in the dispersion to get an output voltage greater than the output voltage of organic phase; and the amount of brine phase needed to get an output voltage commensurate with the output voltage of brine phase. The amount of brine phase added to each mixture, expressed as volume added per total volume of the dispersion, and the output voltage, in volts, is illustrated in Table 4 below.

TABLE 4

| % brine phase | Output Voltage (v) |
|---|---|
| 14.3% | 0 |
| 15.4% | 0.1536 |
| 20.0% | 0.2208 |
| 50.0% | 0.944 |
| 55.6% | 1.088 |

TABLE 4-continued

| % brine phase | Output Voltage (v) |
|---|---|
| 62.5% | 1.2848 |
| 71.4% | 1.424 |
| 83.3% | 1.792 |
| 100% | 2.4 |

Thereby, a process for the effective separation and purification of a reaction mixture obtained in a two-phase interfacial process for making polycarbonates is provided. The continuous removal of impurities provides both an economical and efficient process for polycarbonate production. Within the process, proper detection of the interface between the phases contributes to an increase in the overall accuracy and efficiency.

Generally, leveling sensors work upon the principle of density difference between two phases. These types of sensors are not effective where the difference in density is small, e.g., less than or equal to about 1 gram per cubic centimeter (g/cc), resulting in a mixing zone instead of a clear interface between the phases. By employing the present sensor, the interface between the phases can be detected, irregardless of the density difference, enabling accurate and efficient separation (e.g., withdrawal from the decanter) of the two phases. In other words, the interface can be detected at a density difference of less than, equal to, or greater than about 1 g/cc, at less than or equal to about 0.5 g/cc, and even at less than or equal to about 0.1 g/cc.

Additionally, when a TEFLON® sheath (or similarly coated inductance probe) is employed, polymer fouling of the probe is minimized or eliminated. The measure of inductance is essentially non-contact, since the magnetic field induces a current in the secondary coil. Hence any fouling on the probe due to the polymer (which is small due to the use of TEFLON® is a nonstick material) has a small effect on the inductance value, thus making the measurement reliable even over long periods of operation in contact with a polymeric solution.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting the location of an interface between phases, comprising:
   introducing a reaction mixture into a vessel wherein the reaction mixture is the product of an at least two phase interfacial reaction, and a difference in densities between at least two of the phases is less than or equal to about 1 g/cc;
   separating the reaction mixture into the phases with an interface located therebetween;
   measuring electrical inductance of the reaction mixture at different latitudinal locations; and
   determining the location of the interface.

2. A method according to claim 1, wherein the vessel is a plate decanter.

3. A method according to claim 1, wherein the vessel is a coalescer decanter.

4. A method according to claim 1, wherein the difference in densities is less than or equal to about 0.5 g/cc.

5. A method according to claim 4, wherein the difference in densities is less than or equal to about 0.1 g/cc.

6. A method of detecting the location of an interface between two phases, comprising:

introducing a reaction mixture into a vessel wherein the reaction mixture is the product of a two phase interfacial reaction for the preparation of polycarbonate;

separating the reaction mixture into an organic phase and an aqueous phase with an interface located therebetween;

measuring electrical inductance of the reaction mixture at different latitudinal locations; and determining the location of the interface.

7. A method according to claim 6, wherein the vessel is a plate decanter.

8. A method according to claim 7, wherein the vessel is a coalescer decanter.

* * * * *